United States Patent
Wu et al.

(10) Patent No.: US 8,443,095 B1
(45) Date of Patent: May 14, 2013

(54) USER SPACE DATA STREAM PARSING USING TCP/IP INFORMATION

(75) Inventors: Chun-Da Wu, Taipei (TW); Chia-Chi Chang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1417 days.

(21) Appl. No.: 11/315,949

(22) Filed: Dec. 21, 2005

(51) Int. Cl.
G06F 15/16 (2006.01)
G06F 15/173 (2006.01)

(52) U.S. Cl.
USPC ........... 709/230; 709/223; 709/226; 709/229; 709/236

(58) Field of Classification Search .................... 709/230
See application file for complete search history.

(56) References Cited

U.S. PATENT DOCUMENTS

| | | | |
|---|---|---|---|
| 6,272,148 B1 * | 8/2001 | Takagi et al. | 370/469 |
| 7,080,077 B2 * | 7/2006 | Ramamurthy et al. | 707/9 |
| 7,099,914 B1 * | 8/2006 | Hartmann et al. | 709/203 |
| 7,124,203 B2 * | 10/2006 | Joshi et al. | 709/248 |
| 7,134,137 B2 * | 11/2006 | Joshi et al. | 726/1 |
| 7,194,764 B2 * | 3/2007 | Martherus et al. | 726/8 |
| 7,237,008 B1 * | 6/2007 | Tarbotton et al. | 709/206 |
| 7,298,746 B1 * | 11/2007 | De La Iglesia et al. | 370/394 |
| 7,391,854 B2 * | 6/2008 | Salonen et al. | 379/114.2 |
| 7,447,775 B1 * | 11/2008 | Zhu et al. | 709/226 |
| 7,464,162 B2 * | 12/2008 | Chan | 709/225 |
| 2002/0091745 A1 * | 7/2002 | Ramamurthy et al. | 709/100 |
| 2002/0091798 A1 * | 7/2002 | Joshi et al. | 709/219 |
| 2002/0099671 A1 * | 7/2002 | Mastin Crosbie et al. | 705/500 |
| 2002/0120599 A1 * | 8/2002 | Knouse et al. | 707/1 |
| 2003/0198189 A1 * | 10/2003 | Roberts et al. | 370/252 |
| 2003/0214923 A1 * | 11/2003 | Omae et al. | 370/331 |
| 2005/0144363 A1 * | 6/2005 | Sinclair | 711/103 |
| 2005/0209927 A1 * | 9/2005 | Aaltonen et al. | 705/26 |
| 2006/0047839 A1 * | 3/2006 | Tate et al. | 709/230 |
| 2006/0161503 A1 * | 7/2006 | Popescu et al. | 705/400 |
| 2007/0038888 A1 * | 2/2007 | Kariv | 714/10 |

OTHER PUBLICATIONS

Non-Patent Literature from the UIC website, "TCP Timeout and Retransmission", specifically pp. 11 and 12 of 17 dated Nov. 1, 2004.*

* cited by examiner

*Primary Examiner* — Richard G Keehn
(74) *Attorney, Agent, or Firm* — IPSG, P.C. Intellectual Property Law

(57) ABSTRACT

Techniques for efficiently determining the boundary between files and for ascertaining the difference between a HEAD response and a GET response. Embodiments of the invention only need to check the responses from the server, instead of having to check to both the responses from the server and the requests from the client, in order to ascertain the boundary between files and to ascertain whether a response from the server is a HEAD response or a GET response.

22 Claims, 5 Drawing Sheets

USER SPACE DATA STREAM PARSING USING TCP/IP INFORMATION

BACKGROUND OF THE INVENTION

In a client-server environment, packets are exchanged between a server computer and one or more client computers. In a HTTP environment, for example, a HTTP server typically exchanges HTTP packets with one or more HTTP clients. HTTP technology is quite well established and will not be explained in details herein.

From time to time, there may exist a need to parse the HTTP packets to obtain the information encapsulated by the packets. For example, applications such as scanning to support malware detection (e.g., virus or adware) and/or content filtering to support business rule implementation often parse HTTP packets to obtain the content (e.g., payload) of the packet. The content may then be scanned and/or filtered to detect the possible presence of malware, for example.

FIG. 1 shows a view of a portion of a data stream from the HTTP 1.1 (RFC 2616) perspective. Generally speaking, there are two types of HTTP responses: a HEAD response and a GET response. From the point of view of HTTP, a HEAD response returns only the HTTP header while a GET response returns both the HTTP header (102 and 106) and the HTTP content (104 and 108). For certain applications, the content is of primary interest. Accordingly, the ability to distinguish between a GET response and a HEAD response is as relevant content exists in the HEAD response but not in the GET response.

Boundary determination is also an important issue to resolve. A boundary marks the termination of a given file and the start of a new file. Accurate and efficient boundary determination allows the application to accurately and efficiently obtain the content of a given file, for example.

In the prior art, HTTP parsing is performed on both client-transmitted packets (e.g., the client requests) and server transmitted packets (e.g., the server responses) in order to accomplish boundary determination. This is because the typical HTTP parser only sees the HTTP header and HTTP content if a content exists. The need to parse both client-transmitted packets and server-transmitted packets disadvantageously imposes a heavy processing load on the system's CPU and/or memory resources, leading to degraded system performance. System performance is further degraded if state-based parsing is employed to parse the client-transmitted packets and the server-transmitted packets since state machines (such as state machine 302 illustrated in the example of FIG. 3) tend to be resource-intensive to execute.

SUMMARY OF INVENTION

The invention relates, in an embodiment, to a computer-implemented method in a processor-enabled system for analyzing a HTTP packet exchanged between a server computer and a client computer. The processor-enabled system represents one of the client computer and a system other than the server computer and the client computer that also receives the HTTP packet. The method includes modifying a kernel of an operating system of the processor-enabled system to include code that passes a set of data from the kernel to an application in an application space of the monitoring system, the set of data including includes TL value, IP_HD_LN value, and TCP_HD_LN value. The TL value represents a total packet length of the HTTP packet. The IP_HD_LN value represents a length of an IP header of the HTTP packet, and the TCP_H-D_LN value represents a length of a TCP header of the HTTP packet. The method further includes ascertaining a value X that is equal to TL−(IP_HD_LN+TCP_HD_LN+HT_H-D_LN), wherein the HT_HD_LN represents a length of a HTTP header of the HTTP packet. The method additionally includes designating, if the value X is greater than zero, the HTTP packet a GET response from the server computer, wherein the analyzing is performed only on response packets from the server computer and not on request packets from the client computer.

In another embodiment, the set of data further includes a TCP ACK number associated with the HTTP packet. The method additionally includes determining, using the application, whether the TCP ACK number represents a change from a prior TCP ACK number that is associated with a last-received HTTP packet, the last-received HTTP packet being received at the processor-enabled system immediately prior to receiving the HTTP packet at the processor-enabled system. The method further includes designating, if the TCP ACK number represents a change from the prior TCP ACK number, the HTTP packet as belonging to a file that is different from a file associated with the last-received HTTP packet.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
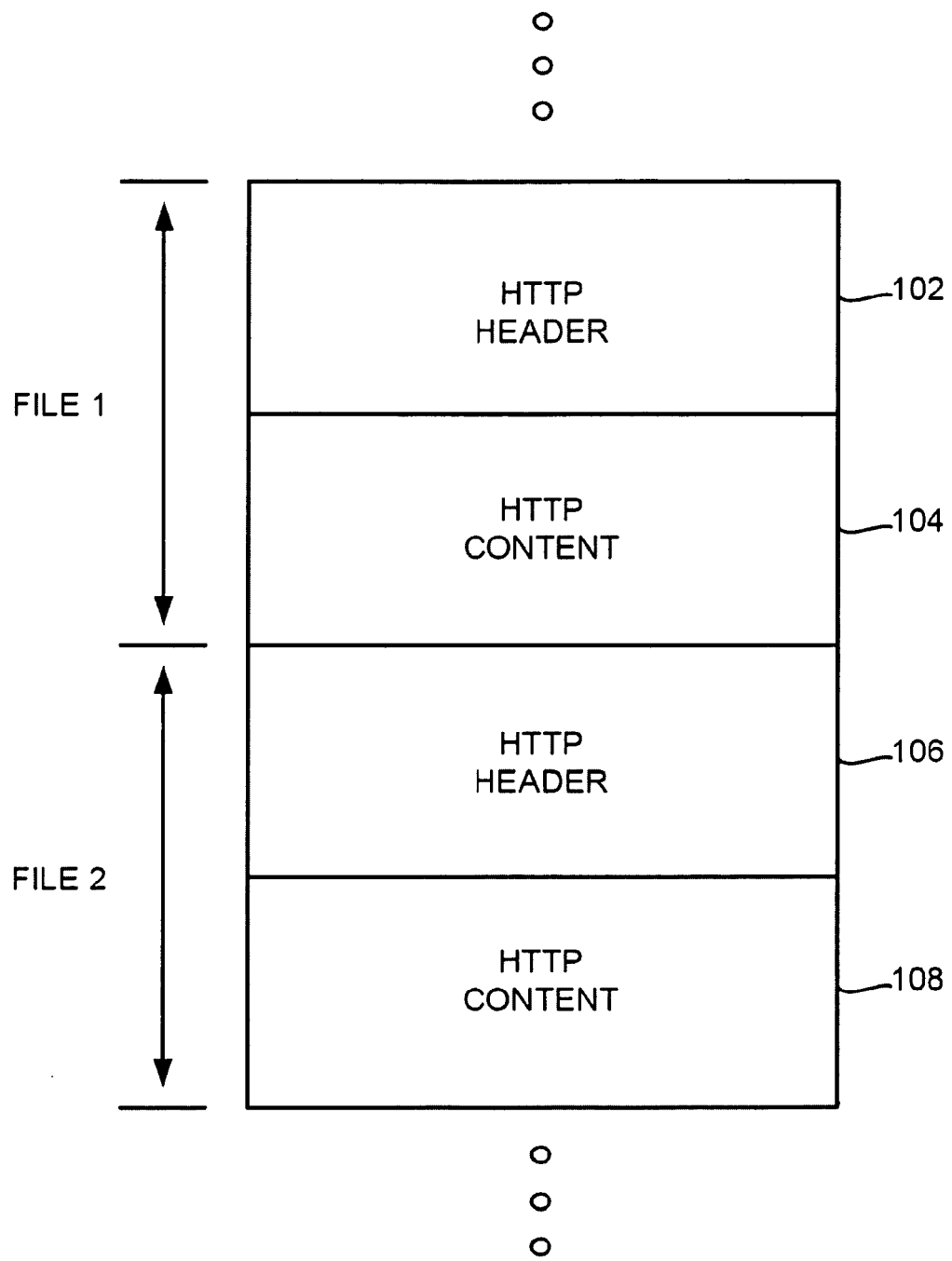
FIG. 1 shows a view of a portion of a data stream from the HTTP 1.1 (RFC 2616) perspective.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the invention, there are provided techniques for efficiently determining the boundary between files and for ascertaining the difference between a HEAD response and a GET response. Embodiments of the invention only need to check the responses from the server, instead of having to check to both the responses from the server and the requests from the client, in order to ascertain the boundary between files and to ascertain whether a response from the server is a HEAD response or a GET response. Embodiments of the invention advantageously employ a mathematical approach, instead of a state table approach, in determining whether a given response represents a HEAD response or a GET response.

In an embodiment, the invention applies to the LINUX™ platform although such is not a limitation. That is, the invention may readily applies to other platforms such as MICROSOFT™ WINDOWS™, UNIX™, APPLE™, etc. Modification is made to the kernel to extract the TCP header and the IP header information and to pass the TCP header information and the IP header information from the kernel space to the user space of the operating system so that the TCP header information and the IP header information may be employed by an application in the user space to efficiently determining the boundary between files and for ascertaining the difference between a HEAD response and a GET response.

The inventors herein note that in the typical case, the HTTP layer which is available to applications in the user space of the OS (operating system) only provides information regarding the HTTP header and the HTTP content. However, the TCP layer and the IP layer, which are accessible to the kernel space of the OS, contain information that can help applications in the user space to efficiently determine the boundary between files and for ascertaining the difference between a HEAD response and a GET response.

Figure 2:
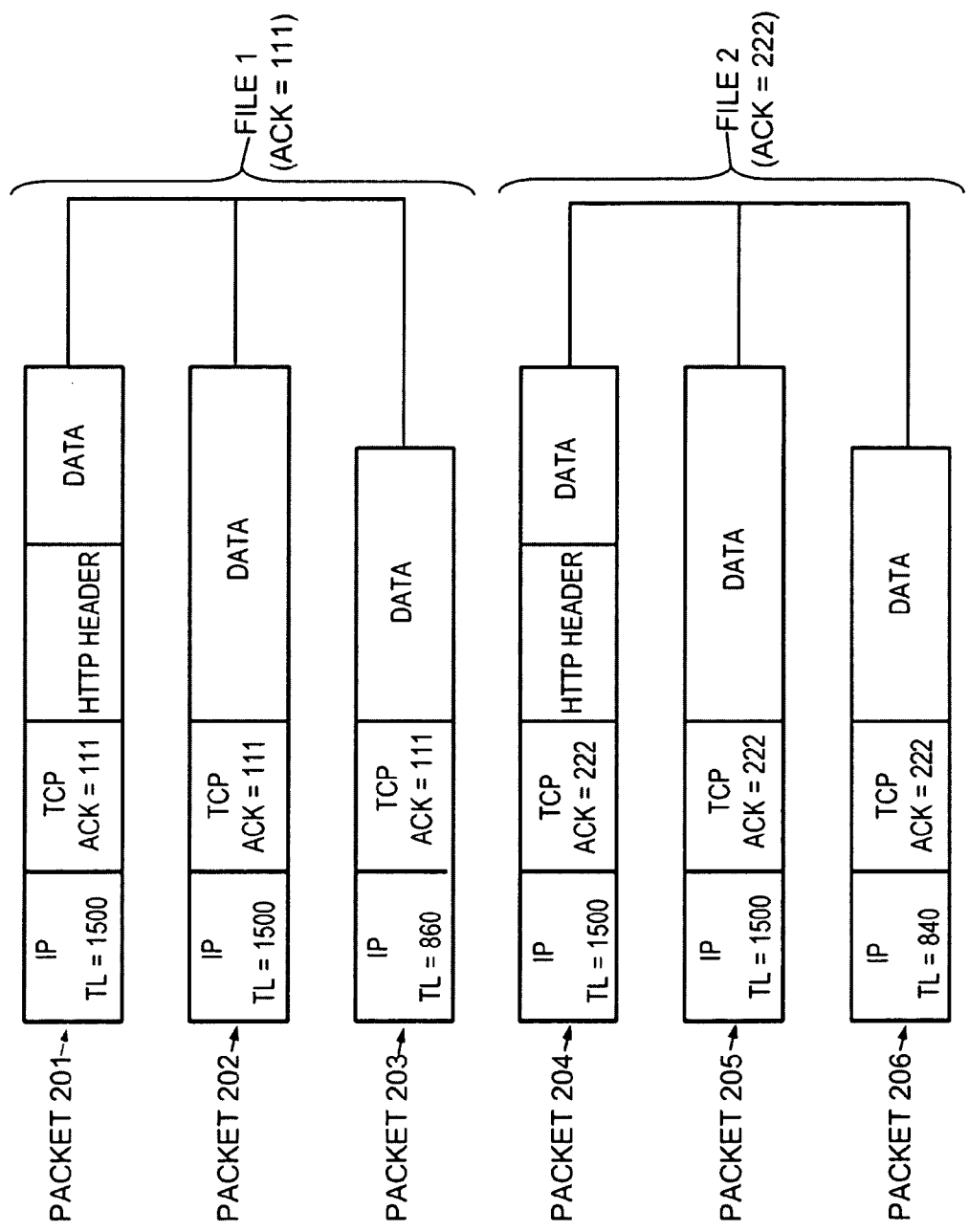
FIG. 2 illustrates the same transmission of the two files of FIG. 1, albeit from the TCP/IP perspective.

FIG. 2 illustrates the same transmission of the two files of FIG. 1, albeit from the TCP/IP perspective. As can be seen, the TCP information includes the TCP's ACK number. Note that all HTTP packets (e.g., packet 201, packet 202, and packet 203) associated with a single file (e.g., File_1) have the same TCP's ACK number. Accordingly, File_1 has TCP's ACK number 111, whereas packet 204, packet 205, and packet 206 of File_2 have TCP's ACK number 222 in the example of FIG. 2. The IP information includes the total length (TL) for each packet.

By modifying the kernel to provide the TCP/IP information from the kernel space of the OS to the user space, applications in the user space can access the TCP information and the IP information for determining the boundary between files and for ascertaining the difference between a HEAD response and a GET response. Note that this information is available to and is already employed by the kernel to ensure that the packets are properly delivered. The modification involves passing the TCP and IP header information from the kernel space to the user space.

Figure 3:
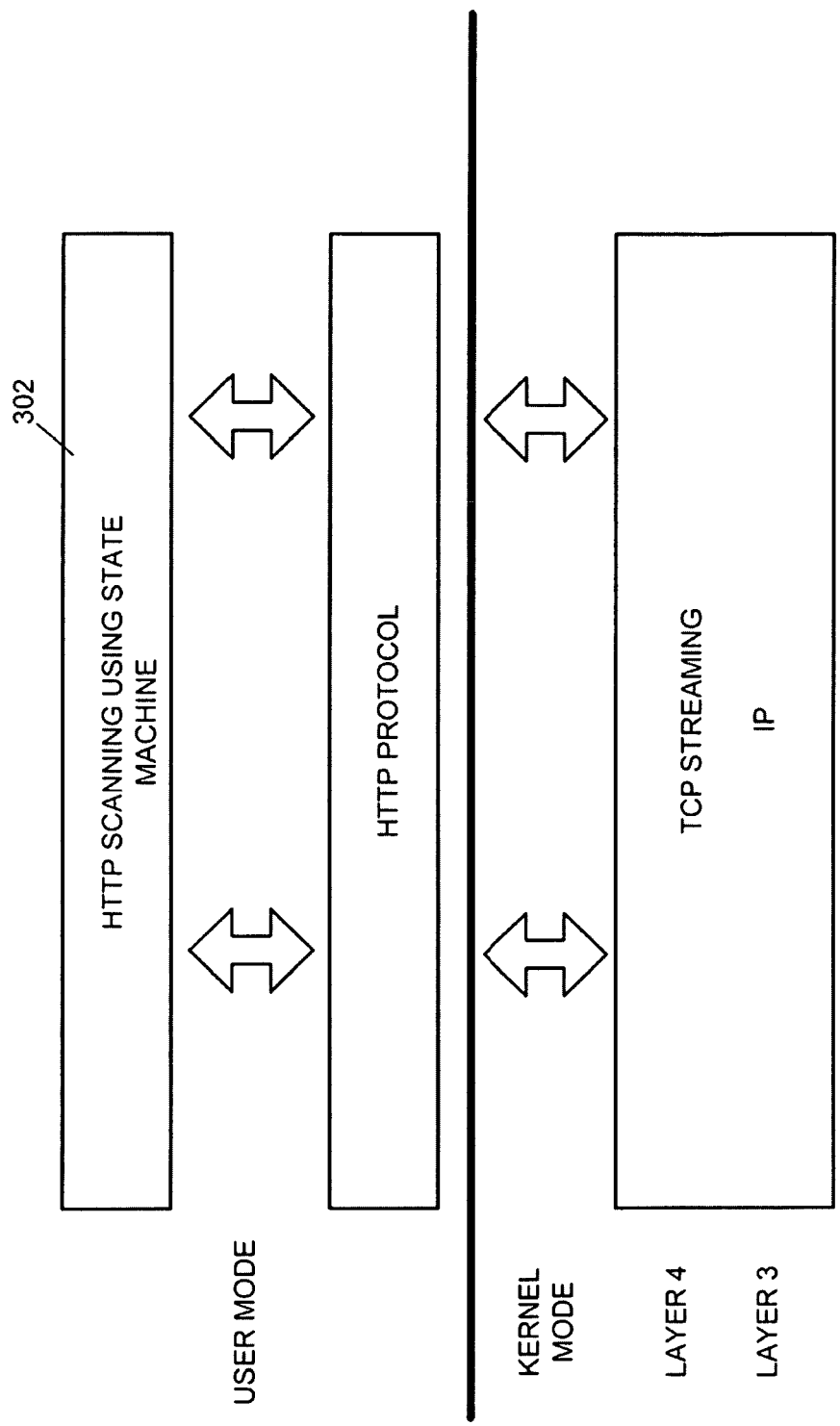
FIG. 3 shows the prior art approach in which the TCP/IP information is unavailable to the application for the purpose of determining the boundary between files and for ascertaining the difference between a HEAD response and a GET response.

FIG. 3 shows the prior art approach in which the TCP/IP information is unavailable to the application for the purpose of determining the boundary between files and for ascertaining the difference between a HEAD response and a GET response. Accordingly, computationally intensive techniques such as state machines have been employed in the past on both the server responses and the client requests for boundary determination and for discriminating between HEAD and GET responses.

Figure 4:
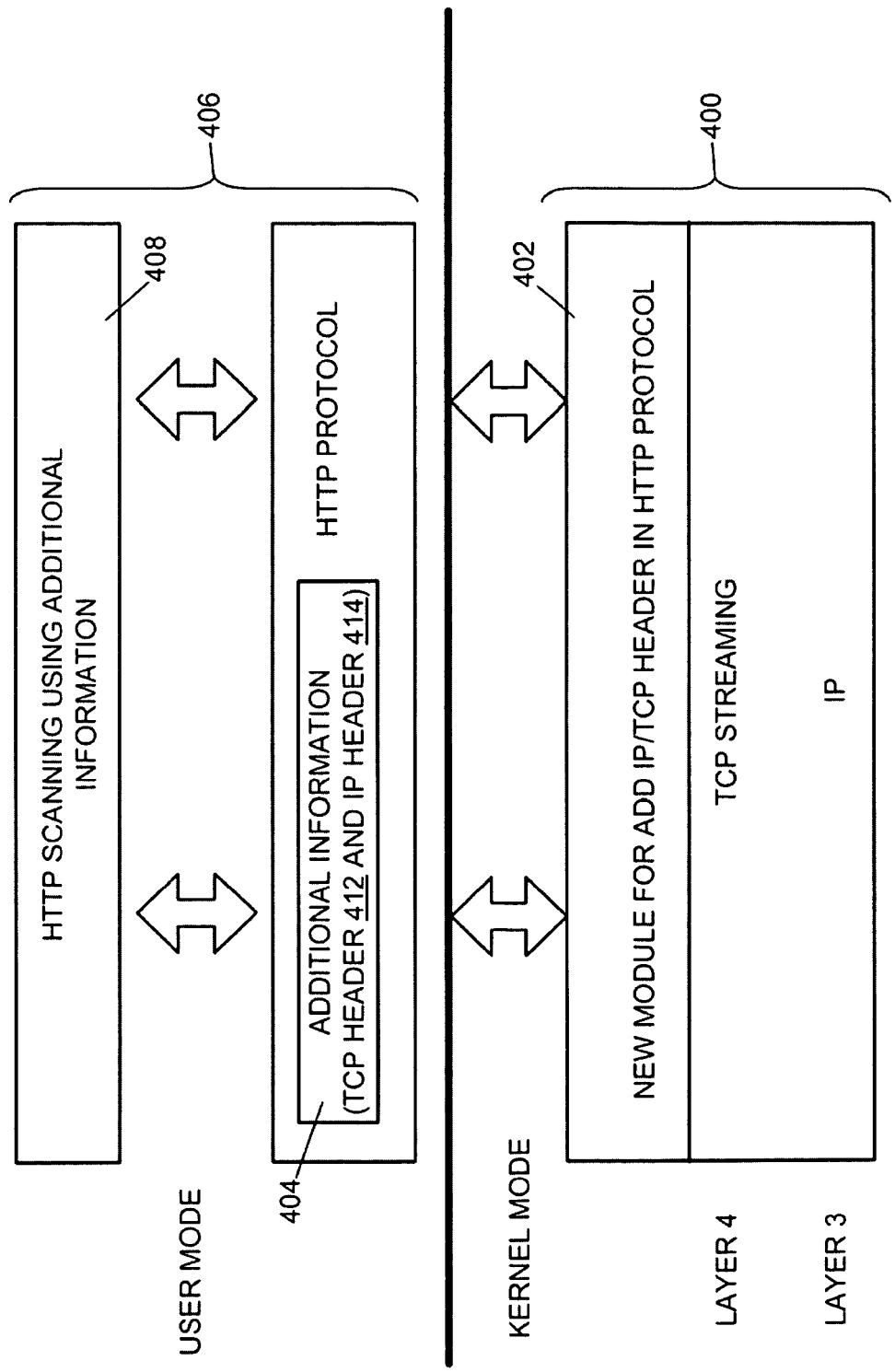
FIG. 4 shows, in accordance with embodiments of the invention, the proposed approach in which modifications to the kernel code extract the TCP/IP information and provide the TCP/IP information to the user space so that applications can determine the boundary between files and for ascertain the difference between a HEAD response and a GET response.

FIG. 4 shows, in accordance with embodiments of the invention, the proposed approach in which modifications 402 to the kernel code 400 extract the TCP/IP information 404 and provide the TCP/IP information 404 to the user space 406 so that applications can determine the boundary between files and for ascertain the difference between a HEAD response and a GET response. In this case, the IP information is provided in an IP header, and the TCP information is provided in the TCP header. Thus, the header information available to the application in the user space includes not only the HTTP header (as expected) but also the TCP header 412 and the IP header 414.

With the TCP/IP information 404 available to applications (e.g., application 408) in the user space 406, it is no longer necessary to analyze the traffic from both the server and the client. For example, an application may simply monitor the change from one TCP's ACK number to a different TCP's ACK number in the data stream from the server to ascertain the change from one file to the next. Thus, if a TCP ACK number is different from the immediately prior TCP ACK number (i.e., TCP ACK number associated with the last-received HTTP packet that was received immediately prior to the current HTTP packet being received), a file boundary has been crossed. This ability to efficiently detect file boundaries simplifies parser design and reduces the computational load required by the parser.

Figure 5A:
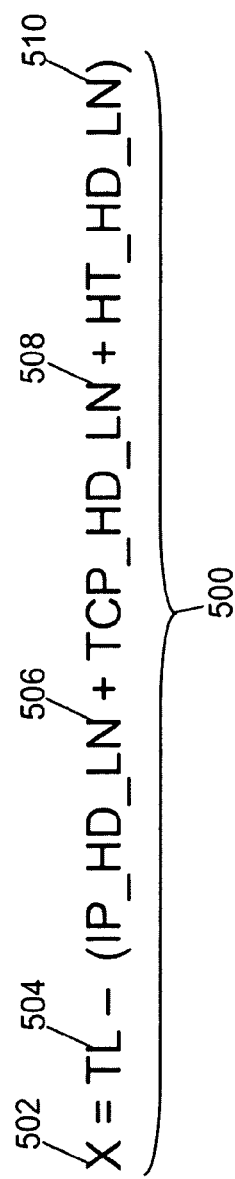
FIG. 5A shows, in accordance with embodiments of the invention, an equation employed to ascertain whether a server response is a GET response or a HEAD response.
Figure 5B:
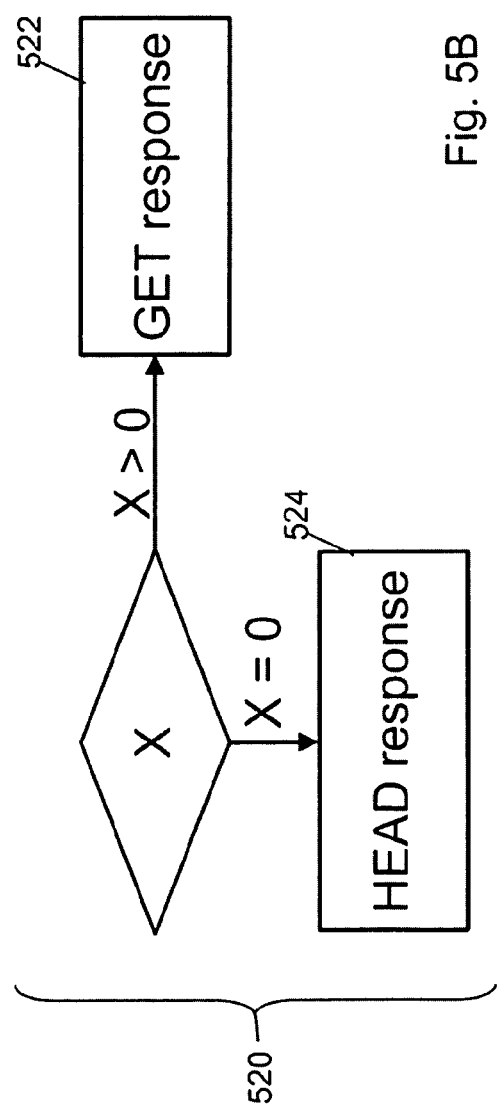
FIG. 5B shows, in accordance with embodiments of the invention, a formula employing the equation shown in FIG. 5A for ascertaining whether a server response is a GET response or a HEAD response.

With respect to the discrimination between a GET response and a HEAD response, the TCP/IP information 404 rendered available by the kernel modification 402 makes it possible to perform this discrimination task without having to resort to computationally intensive techniques such as state machines. FIG. 5A shows, in accordance with embodiments of the invention, an equation 500 employed to ascertain whether a server response is a GET response or a HEAD response. FIG. 5B shows, in accordance with embodiments of the invention, a formula 520 employing equation 500 shown in FIG. 5A for ascertaining whether a server response is a GET response or a HEAD response.

$$X = TL - (IP\_HD\_LN + TCP\_HD\_LN)$$ in the example of FIG. 5A wherein

TL (indicated by a reference numeral 504) represents the total packet length as provided by the IP information, IP_HD_LN (indicated by a reference numeral 506) represents the length of the IP header (i.e., the number of bytes employed by the IP header to carry the IP information).

TCP_HD_LN (indicated by a reference numeral 508) represents the length of the TCP header (i.e., the number of bytes employed by the TCP header to carry the TCP information).

HT_HD_LN (indicated by a reference numeral 510) represents the length of the HTTP header (i.e., the number of bytes employed by the HTTP header to carry the HTTP information).

Note that the length of the IP header, the TCP header, and the HTTP header can be easily ascertained through computation or through configuration settings, for example. If X (indicated by a reference numeral 502)>0, the server response is deemed a GET response (step 522 in the example of FIG. 5B). This is because if the length of the packet is greater than the sum of length of the headers (TCP, IP, and HTTP headers), the packet is deemed to carry content.

If X (indicated by a reference numeral 502)=0, the server response is deemed a HEAD response (step 524 in the example of FIG. 5B). This is because if the length of the packet is equal to the sum of length of the headers (TCP, IP, and HTTP headers), the packet is deemed to carry no content.

If X=0, the server response is deemed a HEAD response. This is because if the length of the packet is equal to the sum of length of the headers (TCP, IP, and HTTP headers), the packet is deemed to carry no content.

The invention may also be incorporated into an HTTP gateway and/or proxy server (which may be used for any number of tasks) for performance enhancement. Since the invention only requires that the server responses be monitored (instead of monitoring both client requests and server responses), performance may be significantly improved for tasks that requires ascertaining file boundaries and/or the discrimination between get responses and head responses.

As can be appreciated from the foregoing, embodiments of the invention substantially simplify the parsing task and/or reduce the computational load required to determine file boundaries and to discriminate between a GET response and a HEAD response. By making modifications to the kernel to pass the TCP/IP header information from the kernel space to the user space, applications can employ the TCP header information (e.g., the ACK number) to ascertain the boundary between files in a data stream from the server. Applications can also use information pertaining to the total packet length (provided by the IP header), and the length of the TCP, IP, and HTTP headers, to efficiently discriminate between GET responses and HEAD responses.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a processor-enabled system, a computer-implemented method for analyzing a HTTP packet exchanged between a server computer and a client computer, said processor-enabled system representing one of said client computer and a system other than said server computer and said client computer that also receives said HTTP packet, a kernel of an operating system of said processor-enabled system being previously unable to provide TCP/IP information to an application space of a monitoring system, said method comprising:
adding code to said kernel of said operating system of said processor-enabled system;
using said code to pass a set of data from said kernel to an application in said application space of said monitoring system, said set of data including a TCP ACK number associated with said HTTP packet, said TCP ACK number being configured for acknowledging receipt of data;
ascertaining, using said application that said TCP ACK number is different from a prior TCP ACK number that is associated with a last-received HTTP packet, said last-received HTTP packet being received at said processor-enabled system immediately prior to receiving said HTTP packet at said processor-enabled system;
designating, based on said ascertaining, said HTTP packet as belonging to a second file that is different from a first file associated with said last-received HTTP packet;
wherein said set of data further includes a TL value, an IP_HD_LN value, and a TCP_HD_LN value, said TL value representing a total packet length of said HTTP packet, said IP_HD_LN value represents a length of an IP header of said HTTP packet, and said TCP_HD_LN value represents a length of a TCP header of said HTTP packet;
determining a value X that is equal to $$TL-(IP\_HD\_LN+TCP\_HD\_LN+HT\_HD\_LN)$$

wherein said HT_HD_LN represents a length of a HTTP header of said HTTP packet;
if said value X is greater than zero, designating said HTTP packet as a GET response from said server computer; and
if said value X is equal to zero, designating said HTTP packet as a HEAD response from said server computer.

2. The method of claim 1 wherein said analyzing is performed only on response packets from said server computer and not on request packets from said client computer.

3. The method of claim 1 wherein said processor-enabled system represents a HTTP gateway that is different from said server computer and said client computer.

4. The method of claim 1 wherein said processor-enabled system represents said client computer.

5. The method of claim 1 further comprising using said processor-enabled system to perforin malware scanning, said ascertaining represents an operation performed to enable said malware scanning.

6. The method of claim 1 further comprising using said processor-enabled system to perform computer virus scanning, said ascertaining represents an operation performed to enable said virus scanning.

7. The method of claim 1 further comprising using said processor-enabled system to perform content filtering, said ascertaining represents an operation performed to enable said content filtering.

8. The method of claim 1 wherein said processor-enabled system represents a HTTP proxy server that is different from said server computer and said client computer.

9. In a processor-enabled system, a computer-implemented method for analyzing a HTTP packet exchanged between a server computer and a client computer, said processor-enabled system representing one of said client computer and a system other than said server computer and said client computer that also receives said HTTP packet, a kernel of an operating system of said processor-enabled system being previously unable to provide TCP/IP information to an application space of a monitoring system, said method comprising:
adding code to said kernel of said operating system of said processor-enabled system;
using said code to pass a set of data from said kernel to an application in said application space of said monitoring system, said set of data including a TCP ACK number associated with said HTTP packet, said TCP ACK number being configured for acknowledging receipt of data;

using said TCP ACK number included in said set of data to determine at least a file boundary between a first file and a second file;

a TL value, an IP_HD_LN value, and a TCP_HD_LN value in said set of data, said TL value representing a total packet length of said HTTP packet, said IP_HD_LN value represents a length of an IP header of said HTTP packet, and said TCP_HD_LN value represents a length of a TCP header of said HTTP packet;

ascertaining that said TL value is greater than a sum of said IP_HD_LN value, said TCP_HD_LN value, and an HT_HD_LN value;

determining a value X that is equal to $$TL-(IP\_HD\_LN+TCP\_HD\_LN+HT\_HD\_LN)$$

wherein said HT_HD_LN represents a length of a HTTP header of said HTTP packet;

if said value X is greater than zero, designating said HTTP packet as a GET response from said server computer; and if said value X is equal to zero, designating said HTTP packet as a HEAD response from said server computer.

10. The method of claim 9 wherein said processor-enabled system represents a HTTP gateway that is different from said server computer and said client computer.

11. The method of claim 9 further comprising using said processor-enabled system to perform malware scanning, said ascertaining represents an operation performed to enable said malware scanning.

12. The method of claim 9 further comprising using said processor-enabled system to perform computer virus scanning, said ascertaining represents an operation performed to enable said virus scanning.

13. The method of claim 9 further comprising using said processor-enabled system to perform content filtering, said ascertaining represents an operation performed to enable said content filtering.

14. The method of claim 9 wherein said processor-enabled system represents a HTTP proxy server that is different from said server computer and said client computer.

15. The method of claim 9 further comprising:

determining, using said application, that said TCP ACK number is different from a prior TCP ACK number that is associated with a last-received HTTP packet, said last-received HTTP packet being received at said processor-enabled system immediately prior to receiving said HTTP packet at said processor-enabled system; and designating, based on said ascertaining, said HTTP packet as belonging to said second file that is different from said first file, said first file being associated with said last-received HTTP packet.

16. In a processor-enabled system, a computer-implemented method for analyzing a HTTP packet exchanged between a server computer and a client computer, said processor-enabled system representing one of said client computer and a system other than said server computer and said client computer that also receives said HTTP packet, a kernel of an operating system of said processor-enabled system being previously unable to provide TCP/IP information to an application space of a monitoring system, said method comprising:

adding code to said kernel of said operating system of said processor-enabled system;

using said code to pass a set of data from said kernel to an application in said application space of said monitoring system, said set of data including a TCP ACK number associated with said HTTP packet, a TL value, an IP_HD_LN value, and a TCP_HD_LN value, said TL value representing a total packet length of said HTTP packet, said IP_HD_LN value represents a length of an IP header of said HTTP packet, and said TCP_HD_LN value represents a length of a TCP header of said HTTP packet;

using said TCP ACK number included in said set of data to determine at least a file boundary between a first file and a second file;

determining a value X that is equal to $$TL-(IP\_HD\_LN+TCP\_HD\_LN+HT\_HD\_LN)$$

wherein said HT_HD_LN represents a length of a HTTP header of said HTTP packet;

if said value X is greater than zero, designating said HTTP packet as a GET response from said server computer; and if said value X is equal to zero, designating said HTTP packet as a HEAD response from said server computer.

17. The method of claim 16 further comprising:

determining, using said application, that said TCP ACK number is different from a prior TCP ACK number that is associated with a last-received HTTP packet, said last-received HTTP packet being received at said processor-enabled system immediately prior to receiving said HTTP packet at said processor-enabled system;

designating, based on said determining, said HTTP packet as belonging to said second file that is different from said first file, said first file being associated with said last-received HTTP packet.

18. The method of claim 17 further comprising using said processor-enabled system to perform malware scanning, said determining that said TCP ACK number is different from a prior TCP ACK number represents an operation performed to enable said malware scanning.

19. The method of claim 17 further comprising using said processor-enabled system to perform content filtering of a file received from said server computer, said determining that said TCP ACK number is different from a prior TCP ACK number represents an operation performed to enable said content filtering.

20. The method of claim 16 wherein said processor-enabled system represents a HTTP gateway that is different from said server computer and said client computer.

21. The method of claim 16 wherein said processor-enabled system represents said client computer.

22. The method of claim 16 wherein said processor-enabled system represents a HTTP proxy server that is different from said server computer and said client computer.

* * * * *